United States Patent [19]

Langer et al.

[11] Patent Number: 5,534,104

[45] Date of Patent: Jul. 9, 1996

[54] METHOD AND APPARATUS FOR PRODUCTION OF THREE-DIMENSIONAL OBJECTS

[75] Inventors: Hans J. Langer, Gräfelfing; Johannes Reichle, München, both of Germany

[73] Assignee: EOS GmbH Electro Optical Systems, Planegg, Germany

[21] Appl. No.: 244,498

[22] PCT Filed: Oct. 4, 1993

[86] PCT No.: PCT/EP93/02709

§ 371 Date: May 25, 1994

§ 102(e) Date: May 25, 1994

[87] PCT Pub. No.: WO94/07681

PCT Pub. Date: Apr. 14, 1994

[30] Foreign Application Priority Data

Oct. 7, 1992 [DE] Germany ............ 42 33 812.3

[51] Int. Cl.⁶ ............ B29C 35/08; B29C 41/02
[52] U.S. Cl. ............ 156/275.5; 156/290; 156/307.1; 264/401; 264/308; 264/DIG. 59; 427/510; 427/581; 427/586
[58] Field of Search ............ 156/272.2, 273.3, 156/273.5, 275.5, 290, 307.1, 359, 379.6; 264/401, 308, DIG. 59; 425/174.4; 427/510, 581, 586

[56] References Cited

U.S. PATENT DOCUMENTS

| | | | |
|---|---|---|---|
| 3,280,230 | 10/1966 | Bradshaw et al. | 264/448 |
| 3,301,725 | 1/1967 | Frontera | 156/59 |
| 3,539,410 | 11/1970 | Meyer | 156/58 |
| 3,932,923 | 1/1976 | DiMatteo | 29/407 |
| 4,575,330 | 3/1986 | Hull | 425/174.4 |
| 4,961,154 | 10/1990 | Pomerantz et al. | 395/119 |
| 5,031,120 | 7/1991 | Pomerantz et al. | 364/468 |
| 5,104,592 | 4/1992 | Hull et al. | 264/401 |
| 5,182,055 | 1/1993 | Allison et al. | 264/401 |
| 5,182,056 | 1/1993 | Spence et al. | 264/401 |
| 5,256,340 | 10/1993 | Allison et al. | 264/401 |

FOREIGN PATENT DOCUMENTS

| | | |
|---|---|---|
| 0171069B1 | 2/1986 | European Pat. Off. |
| 0362982A2 | 4/1990 | European Pat. Off. |
| 0416124A1 | 3/1991 | European Pat. Off. |
| 0429196A2 | 5/1991 | European Pat. Off. |
| 0484183A1 | 5/1992 | European Pat. Off. |
| WO89/10801 | 11/1989 | WIPO |
| WO92/20505 | 11/1992 | WIPO |

Primary Examiner—David A. Simmons
Assistant Examiner—J. Sells
Attorney, Agent, or Firm—George W. Neuner

[57] ABSTRACT

In a method for producing a three-dimensional object by successive solidification of superposed layers of the object a deformation of the object caused by shrinkage during the solidification shall be reduced. To this end first of all respective partial regions (6a ... 6k) of a layer are solidified and simultaneously connected with underlying partial regions of the previously solidified layer to form multilayered cells and thereafter adjacent partial regions of the same layer are interconnected by solidifying narrow connecting regions (8a ... 8p). The intermediate regions (7) between the individual partial regions are solidified by post-curing.

10 Claims, 2 Drawing Sheets

METHOD AND APPARATUS FOR PRODUCTION OF THREE-DIMENSIONAL OBJECTS

The invention relates to a method and to an apparatus for production of three-dimensional objects.

An example for such a method is described in the paper of H. Kodama, "Automatic method for fabricating a three-dimensional plastic model with photo-hardening polymer", Rev. Sci. Instrum. 52(11), Nov. 1982L, pages 1770 to 1773. With such a method the problem is encountered that an accuracy to size of the object is not guaranteed. This is in particular caused by the fact that during production the individual layers shrink when solidifying and therefore cause stresses and deformations of the entire layered structure.

In order to solve this problem the EP-A-0,362,982 proposes either to begin with solidifying individual strips only which are connected to adjacent or underlying strips only by means of a support structure or to solidify only regions of the layer whereby gaps are generated between those regions.

The above first mentioned solution is, however, disadvantageous because of the difficult control of the solidification to avoid an adhesion of a strip to the underlying strip. Both solutions have the common disadvantage that the solidity of the object before a possible post-curing is very low and the object may therefore be deformed or broken by action of outer forces.

It is therefore the object of the invention to improve the the accuracy in producing the object while avoiding the above-mentioned drawbacks of the prior art.

According to the invention this object is achieved by a method characterized in claim 1 and by the apparatus characterized in claim 11, resp.

In the following the invention will be described in connection with an embodiment with reference to the figures. In the figures.

Figure 1:
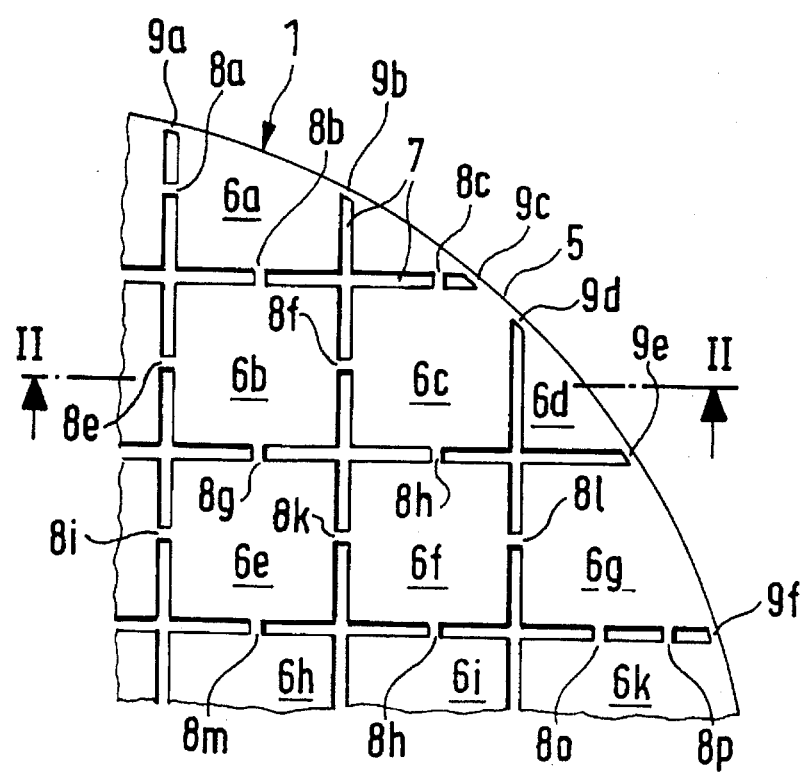
FIG. 1 is a top view of a layer of an object solidified according to the invention.
Figure 2:
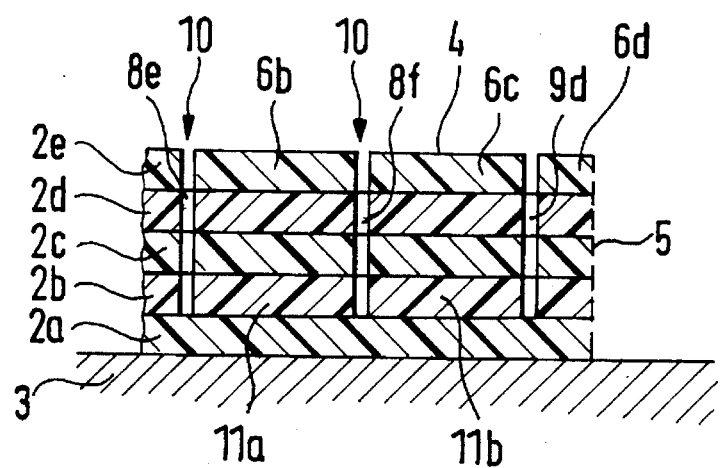
FIG. 2 is a sectional view of the object taken along the line II—II of FIG. 1.

FIG. 1 is a top view of a part of an object 1 of which a section is shown in FIG. 2. The object is produced in the form of individual superposed layers 2a, 2b, 2c, 2d and 2e for example by subsequent solidification of the layers on a support 3 in a bath of liquid resin which can be polymerized by action of electromagnetic radiation. Such a method is known and a detailed description thereof is therefore omitted at this place.

The first layer 2a adjacent to the support 3 is produced in a known manner by complete solidification of the layer within the contour or boundary surface 5 of the object.

FIG. 1 shows the top view of the top face 4 of the uppermost layer 2e which is outwardly defined by the contour 5 of the object 1. The respective further layers 2b . . . 2e are produced according to the same rules and the production of those layers of the object is therefore described in the following by reference to the top view of layer 2e shown in FIG. 1.

First of all a liquid layer formed on the first layer 2a is not solidified everywhere within the contour 5 but only at partial regions 6a . . . 6k spaced from each other at all sides. Those partial regions are shown in FIG. 1 as being substantially square-shaped but may have any other shape. The size of the partial regions is free but preferably a linear dimension of 1–20 mm, in particular 2–10 mm is chosen.

As a consequence narrow liquid intermediate regions referenced in the figure by the sign 7 remain between the partial regions 6a . . . 6k. The width of those intermediate regions, i.e. the clearance between the partial regions 6a . . . 6k, is about 1/20 to 1/500, preferably about 1/50 to 1/200 and particularly preferred about 1/100 of the dimension of the partial regions, i.e. about 0.05 to 0.2 mm, preferably about 0.1 mm.

The partial regions shrink during and after the solidification and the width of the intermediate regions 7 is thereby enlarged. The shrinkage rate is particularly high in the first seconds after the irradiation and for example about 80% of the shrinkage occurs within 10 seconds. Considering the conventional production speed this shrinkage rate means that the shrinkage of the first solidified partial regions of the layer 2b has already terminated to a large extent when solidifying the last partial regions.

After solidification of the partial regions connecting regions in the form of thin connecting webs 8a . . . 8p connecting respective adjacent partial regions 6a, 6b; 6b, 6c; 6b, 6e; etc. are solidified. The width of those connecting webs is in the order of about 1/50 to 1/200 and preferably about 1/100 of the dimension of the partial regions, i.e. about 0.05 to 0.2 mm, preferably about 0.1 mm. One or more connecting webs may be formed between two adjacent partial regions. At the points where the intermediate regions 7 meet the contour 5 boundary regions 9a . . . 9f are formed which either replace the connecting regions of the partial regions 6a, 6c, 6g, 6k adjacent to the contour or are formed in addition to those connecting regions.

The connecting webs 8a . . . 8p and the boundary regions 9a . . . 9f are preferably solidified after the shrinkage of the partial regions 6a . . . 6k, because the forces acting on the connecting webs and therefore the stresses and deformations of the webs are reduced in this case. Formation of the connecting webs therefore preferably starts between those partial regions of a layer which were solidified first and thus have the most advanced shrinkage. Alternatively, the webs may, however, also be solidified simultaneously with the solidification of the respective adjacent partial regions. In any case the purpose of the connecting webs is to interconnect the partial regions 6a . . . 6k and thus to retain the geometric structure and the mechanical stability.

After solidification of the second layer 2b in the described manner the following layers 2c . . . 2e are formed in the same manner. In particular the partial regions 6 are solidified so that individual partial regions 6a . . . 6k are formed exactly on top of the corresponding partial regions 6a . . . 6k of the preceding layer 2b and thus the superposed intermediate regions 7 form vertical gaps 10 which are closed outwardly towards the contour 5 by the superposed boundary regions 9. Simultaneously with the solidification thereof each partial region is connected with the underlying partial regions so that individual cells 11a, 11b etc. in the form of vertical prismatic elements are generated which are interconnected by the superposed connecting regions 8 forming vertical ribs.

The (not shown) uppermost layer of the object 1 is formed in the same manner as the first layer 2a, i.e. as completely solidified layer. Hence, a closed rigid shell or surface of the object 1 is formed by the uppermost layer, the first layer 2a and the boundary regions 9 and remaining liquid material within the gaps 10 can not flow out when withdrawing the object from the bath. This liquid material is subsequently solidified by post-curing under the influence of radiation or heat.

Owing to the solidification of each partial region 6 separate from adjacent partial regions the shrinkage is locally defined. Due to the timely shifted solidification of the connecting regions 8 stresses and deformations are low and are mainly received by the connecting regions whereby the deformation of the entire object is considerably reduced. Owing to the small width of the gaps 10 formed by the narrow intermediate regions 7 the shrinkage occurring when later solidifying the material within those gaps causes an insignificant deformation only. Finally, the specific radiation power used for solidifying the individual partial regions 6 is a free parameter and can therefore be chosen so that high shrinkage values in short time can be achieved for the partial regions 6 and the total deformation of the object 1 is as low as possible.

The size of the partial regions 6 can be freely chosen according to the circumstances; for example, a reduction down to the size of a voxel (scanning irradiation) can be considered. Further, an arbitrary three-dimensional form can be considered in place of the prismatic form of the cells 11 with the consequence that the gaps 10 may extend with a lateral staggering rather than in exact vertical direction. Moreover, the number of connecting webs can be chosen according to the characteristics of the material and to the mechanical specifications of the object. For example, higher mechanical specifications and a more pronounced shrinkage of the material when solidifying require a greater number of webs.

Figure 3:
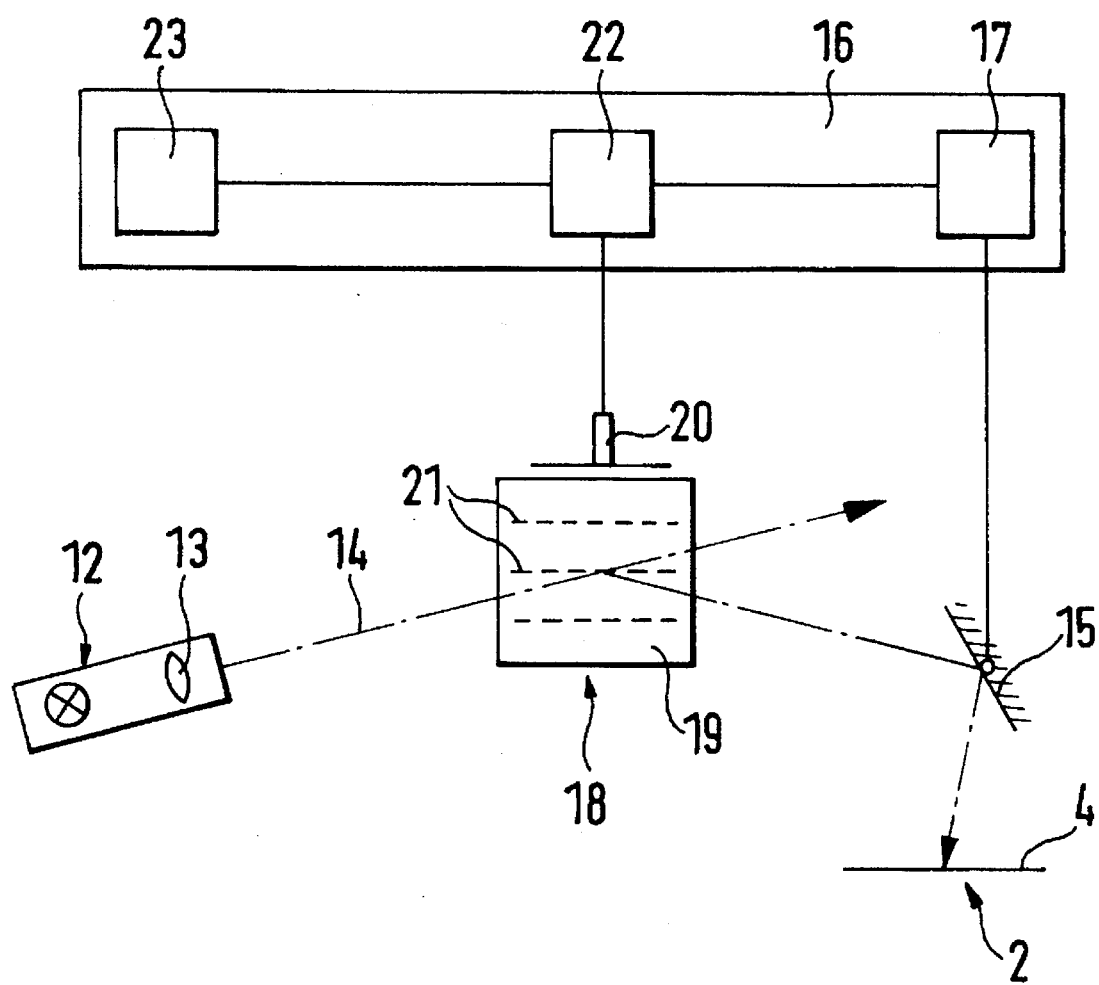
FIG. 3 is a schematic representation of an embodiment of the inventive apparatus.

An apparatus which is suitable for carrying out this method will be described in the following with reference to FIG. 3.

A light source 12, for example a laser, uses an optical system 13 for generating a focussed light beam 14 which is deflected to any place of the surface of the layer 2 by means of a deflection means 15, for example a mirror which is supported to be rotatable around two axes. The deflection of the mirror 15 is controlled by a mirror control 17 provided within a control unit 16 in accordance with the geometric data of the object 1.

An acousto-optical modulator 18 is located in the path of the light beam 14 between the light source 12 and the deflection means. The modulator 18 substantially consists of a crystal 19 and a transducer 20 mounted thereto for generating periodical density variations 21 within the crystal 19. The transducer 20 is connected with a transducer control 22 which comprises a synchronizing means, an on/off control element and a power control element for the transducer 20 and which is coupled to the mirror control and to a bit table 23 stored in the control means 16 in the form of a look-up table.

In operation the transducer control 22 reads from the bit table 23 those points where the solidification of the partial regions 6 shall occur and where, corresponding to the intermediate regions 7, no solidification shall occur. The transducer control 22 excites the transducer 20 by means of the synchronizing means in synchronism with the movement of the deflection means 15 exactly at the time when the light beam 14 coming from the deflection means 15 is to hit a point of the layer 2 corresponding to a partial region 6. Owing to this excitation the density variations 21 are generated within the crystal 19 and the light beam 14 impinging onto the surfaces of the density variations at small angle is reflected so that the reflected beam 14' impinges onto the deflection means 15 and therefrom to the corresponding point of the layer 2, producing a polymerisation at this point.

If the transducer control 22 receives from the bit table 23 the information that an intermediate region 7 is to be formed at the point where the beam impinges onto the layer 2 it switches off the excitation of the transducer 20 in synchronism with the movement of the deflection means 15 exactly at the time when the reflected light beam would impinge at the place corresponding to the intermediate region 7. No reflection of the light beam therefore occurs within the crystal 19 and the light beam 14" does not meet the deflection means 15 and does therefore not impinge on the layer 2.

The transducer control 22 can adjust the degree of density variations within the crystal 19 and thus the fraction of the light beam 14' reflected therefrom by means of the power control element. Additionally to the on/off control of the reflected light beam 14' the power thereof and therefore the speed and degree of polymerisation at the corresponding place of the layer 2 can be controlled.

Any other modulator which is suitable for the rapid switching of a light or laser beam, for example an electro-optical modulator or others, may be used in place of the acousto-optical modulator.

We claim:

1. A method for producing a three-dimensional object by solidifying successive layers of said object within a bath of a liquid material by directing electromagnetic radiation onto said material, said method comprising a) solidifying partial regions of said layer so as to leave narrow liquid intermediate regions between adjacent ones of said partial regions while at the same time connecting said partial regions to corresponding partial regions of a previously solidified layer so as to form multilayered cells, b) interconnecting adjacent ones of said partial regions of said layer by solidifying narrow connecting regions bridging said intermediate regions in the form of connecting webs, and c) thereafter solidifying said intermediate regions between said partial regions for completing the solidification of said object.

2. The method of claim 1, comprising solidifying said connecting regions after expiry of a waiting time corresponding to at least a defined shrinkage of said partial regions.

3. The method of claim 2, wherein said waiting time is between 5 and 100 seconds, preferably about 10 seconds.

4. The method of claim 1, comprising forming said connecting regions between adjacent ones of said cells after solidifying said partial regions of each of said layers.

5. The method of claim 1, comprising forming said connecting webs between said cells in a number of said layers which is lower than the total number of layers of said cells.

6. The method of claim 4, comprising forming one or more of said connecting regions between adjacent ones of said partial regions.

7. The method of claim 1, comprising connecting said partial regions at the periphery of said object for enclosing said intermediate regions.

8. The method of claim 1, comprising solidifying said intermediate regions after solidification of said partial regions of all layers of said object.

9. The method of claim 1, wherein said narrow intermediate regions have a width which is in the order of $1/20$ to $1/200$, preferably about $1/100$ of a dimension of said partial regions.

10. The method of claim 7, comprising completely solidifying the lowermost and topmost layer for forming a completely closed surface of said object in cooperation with said interconnections of said partial regions at said boundary of the said object.

* * * * *